(12) United States Patent
Eskew et al.

(10) Patent No.: US 12,535,241 B2
(45) Date of Patent: Jan. 27, 2026

(54) HVAC SYSTEM HAVING ELECTRICAL SWITCH FOR SUPPLYING POWER TO A FAN AND A COMPRESSOR

(71) Applicant: Johnson Controls Tyco IP Holdings LLP, Milwaukee, WI (US)

(72) Inventors: Robert L. Eskew, Kingman, KS (US); Derrick Madison Guyot, Rose Hill, KS (US); Toan Hai Dinh, Wichita, KS (US); Zili Shi, Wichita, KS (US)

(73) Assignee: Johnson Controls Light Commercial IP GmbH, Schaffhausen (CH)

( * ) Notice: Subject to any disclaimer, the term of this patent is extended or adjusted under 35 U.S.C. 154(b) by 552 days.

(21) Appl. No.: 17/903,752

(22) Filed: Sep. 6, 2022

(65) Prior Publication Data
US 2024/0077227 A1    Mar. 7, 2024

(51) Int. Cl.
*F24F 11/88*    (2018.01)
(52) U.S. Cl.
CPC .................................. *F24F 11/88* (2018.01)

(58) Field of Classification Search
CPC .......... F24F 11/88; F24F 1/22; F24F 2140/12; F25B 49/005; F25B 49/02; F25B 2500/07; F25B 2700/1931; F25B 2700/1933
See application file for complete search history.

(56) References Cited

U.S. PATENT DOCUMENTS

| | | | |
|---|---|---|---|
| 2018/0210475 A1* | 7/2018 | Yang | G05D 23/19 |
| 2019/0264968 A1* | 8/2019 | Tasker | F25B 13/00 |
| 2022/0243938 A1* | 8/2022 | Notaro | F24F 11/36 |
| 2023/0104997 A1* | 4/2023 | Chang | F24F 1/32 62/177 |

* cited by examiner

*Primary Examiner* — Rami R Okasha
(74) *Attorney, Agent, or Firm* — Kelly McGlashen (57) ABSTRACT

A control system for a heating, ventilation, and air conditioning (HVAC) system includes an electrical switch configured to close and enable supply of power to a compressor of the HVAC system based on receipt of an electric current, a first electrical circuit configured to direct the electric current to the electrical switch, and a second electrical circuit configured to direct the electric current to bypass the electrical switch and direct the electric current toward a fan controller of the HVAC system.

16 Claims, 6 Drawing Sheets

HVAC SYSTEM HAVING ELECTRICAL SWITCH FOR SUPPLYING POWER TO A FAN AND A COMPRESSOR

BACKGROUND

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

Heating, ventilation, and/or air conditioning (HVAC) systems are utilized in residential, commercial, and industrial environments to control environmental properties, such as temperature and humidity, for occupants of the respective environments. An HVAC system may control environmental properties by controlling a supply air flow delivered to the environment. For example, the HVAC system may place the supply air flow in a heat exchange relationship with a refrigerant of a vapor compression circuit to condition the supply air flow. In some embodiments, the HVAC system may be a split system including an indoor unit configured to be positioned within a building and an outdoor unit configured to be positioned in an ambient environment surrounding the building. Unfortunately, existing HVAC systems may not be configured to initiate operation in certain conditions, such as certain operating conditions, ambient conditions, and so forth. In such instances, the HVAC system may be unable to provide a supply air flow to a conditioned space when desired.

SUMMARY

In one embodiment, a control system for a heating, ventilation, and air conditioning (HVAC) system includes an electrical switch configured to close and enable supply of power to a compressor of the HVAC system based on receipt of an electric current, a first electrical circuit configured to direct the electric current to the electrical switch, and a second electrical circuit configured to direct the electric current to bypass the electrical switch and direct the electric current toward a fan controller of the HVAC system.

In another embodiment, a heating, ventilation, and air conditioning (HVAC) system includes a compressor configured to discharge a working fluid toward a heat exchanger, an electrical switch configured to provide power to the compressor based on receipt of an electric current via a first electrical circuit, and a fan controller configured to operate a fan to force an air flow across the heat exchanger, where the fan controller is configured to enable supply of power to a fan motor configured to drive the fan based on receipt of the electric current via a second electrical circuit.

In a further embodiment, a heating, ventilation, and air conditioning (HVAC) system includes a first electrical path, a second electrical path, and a third electrical path electrically coupled to one another at a node. The HVAC system also includes a pressure switch disposed along the second electrical path. The first electrical path is configured to direct an electric current from indoor HVAC equipment to the node, the second electrical path is configured to direct the electric current from the node to an electrical switch configured to enable supply of power to a compressor of the HVAC system, and the third electrical path is configured to direct the electric current from the node to a fan controller configured to enable supply of power to a fan of the HVAC system.

DETAILED DESCRIPTION

One or more specific embodiments will be described below. In an effort to provide a concise description of these embodiments, not all features of an actual implementation are described in the specification. It should be noted that in the development of any such actual implementation, as in any engineering or design project, numerous implementation-specific decisions must be made to achieve the developers' specific goals, such as compliance with system-related and business-related constraints, which may vary from one implementation to another. Moreover, it should be noted that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be noted that references to "one embodiment" or "an embodiment" of the present disclosure are not intended to be interpreted as excluding the existence of additional embodiments that also incorporate the recited features.

As briefly discussed above, a heating, ventilation, and/or air conditioning (HVAC) system may be used to thermally regulate a space within a building, home, or other suitable structure. For example, the HVAC system may include a vapor compression system that transfers thermal energy between a working fluid, such as a refrigerant, and a fluid to be conditioned, such as air. The vapor compression system includes heat exchangers, such as a condenser and an evaporator, which are fluidly coupled to one another via one or more conduits of a refrigerant loop or circuit. A compressor may be used to circulate the working fluid (e.g., refrigerant) through the conduits and other components of the refrigerant circuit (e.g., an expansion device) and, thus, enable the transfer of thermal energy between components of the refrigerant circuit (e.g., between the condenser and the evaporator) and one or more thermal loads (e.g., an environmental air flow, a supply air flow).

In many applications, an HVAC system may be configured to operate based on a call for conditioning (e.g., call for cooling, call for heating) associated with a conditioned space. For example, the HVAC system may be configured to initiate operation to condition and provide a supply air flow to the conditioned space based on a deviation between a measured temperature of the conditioned space and a set point (e.g., desired) temperature of the conditioned space. Some systems may include a thermostat configured to receive a user input indicative of the set point temperature, and the thermostat may compare the set point temperature to the measured temperature of the conditioned space and/or other measured temperature indicative of the temperature of the conditioned space. For example, the measured temperature may be received from a sensor, such as a room temperature sensor or a return air sensor.

Based on a determination that the measured temperature deviated from the set point temperature, the thermostat may output a signal (e.g., an electrical signal) to initiate operation of the HVAC system. In some embodiments, the signal may be transmitted to one or more components of the HVAC system to initiate operation of the one or more components to enable supply of a conditioned air flow to the conditioned space. For example, the signal may be transmitted toward a compressor of a vapor compression circuit and toward a controller of a fan configured to direct an air flow across a heat exchanger (e.g., a condenser) of the vapor compression circuit. However, operation of some HVAC system components may be blocked based on a detected operation parameter of the HVAC system (e.g., during high ambient conditions). For example, in existing systems, a pressure switch may be actuated to block transmission of the electrical signal to the compressor and the controller of the fan based on a detected pressure of a working fluid (e.g., a refrigerant) of the vapor compression circuit, such as within the condenser, exceeding or being below a threshold value. Thus, operation of the HVAC system (e.g., operation of the compressor and the fan) may be blocked and/or interrupted based on the detected operating condition until the detected operating condition is within a predetermined range, which may undesirably delay operation of the HVAC system to provide the supply air flow to the conditioned space.

It is now recognized that separately directing the signal generated by the thermostat to the compressor and to the fan controller may enable improved operation of the HVAC system. As described in further detail below, embodiments of the present disclosure include a control system having an improved wiring arrangement configured to direct the signal output by the thermostat to the compressor and to the fan motor individually and in parallel. In this way, operation of certain components of the HVAC system, such as the condenser fan, may not be interrupted based on actuation of the pressure switch. Indeed, enabling operation of the condenser fan during periods when the pressure switch is actuated may enable a reduction in the working fluid pressure within the heat exchanger, thereby promoting deactivation (e.g., reset) of the pressure switch. Accordingly, present embodiments enable the HVAC system to operate to provide the supply air flow to the conditioned space in a more time efficient manner (e.g., during high ambient conditions).

Figure 1:
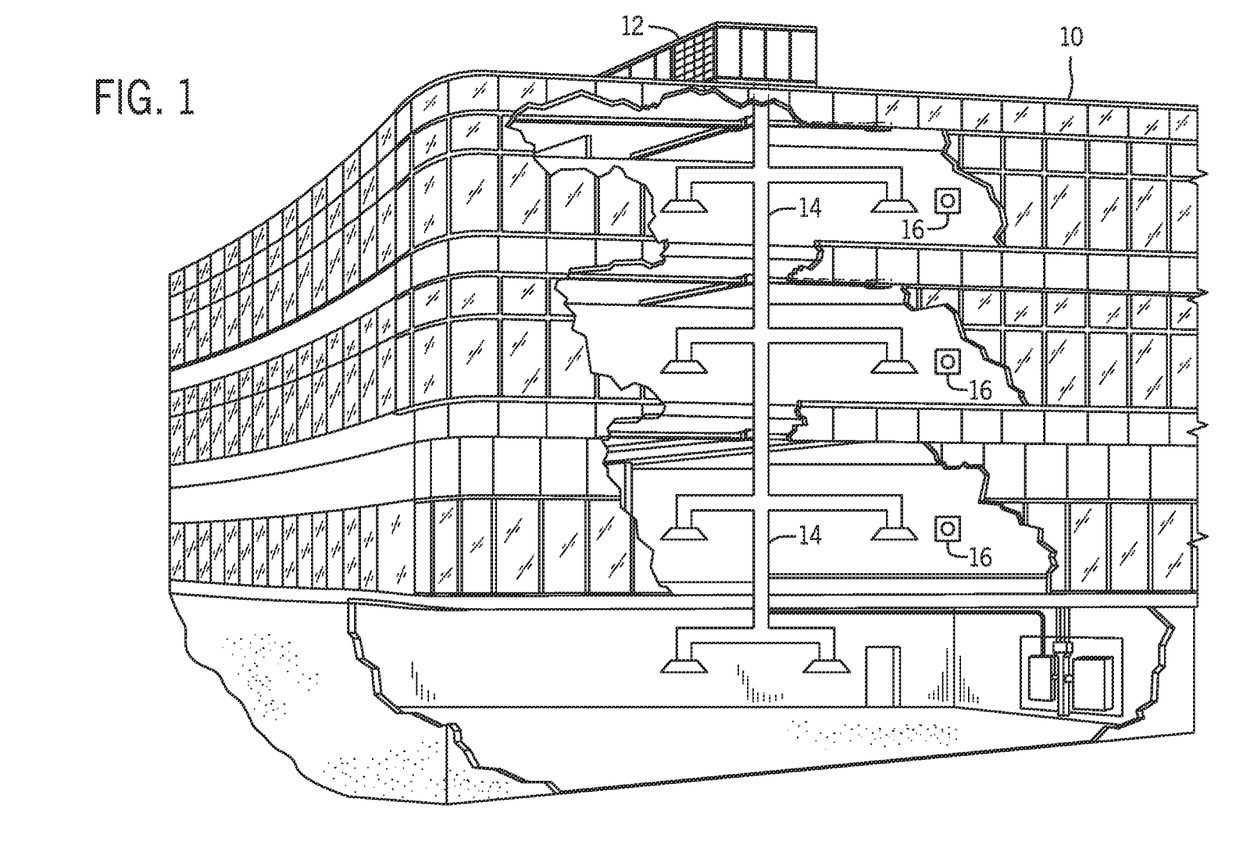
FIG. 1 is a perspective view of an embodiment of a heating, ventilation, and/or air conditioning (HVAC) system for environmental management including an HVAC unit, in accordance with an aspect of the present disclosure.

Turning now to the drawings, FIG. 1 illustrates an embodiment of a heating, ventilation, and/or air conditioning (HVAC) system for environmental management that may employ one or more HVAC units. As used herein, an HVAC system includes any number of components configured to enable regulation of parameters related to climate characteristics, such as temperature, humidity, air flow, pressure, air quality, and so forth. For example, an "HVAC system" as used herein is defined as conventionally understood and as further described herein. Components or parts of an "HVAC system" may include, but are not limited to, all, some of, or individual parts such as a heat exchanger, a heater, an air flow control device, such as a fan, a sensor configured to detect a climate characteristic or operating parameter, a filter, a control device configured to regulate operation of an HVAC system component, a component configured to enable regulation of climate characteristics, or a combination thereof. An "HVAC system" is a system configured to provide such functions as heating, cooling, ventilation, dehumidification, pressurization, refrigeration, filtration, or any combination thereof. The embodiments described herein may be utilized in a variety of applications to control climate characteristics, such as residential, commercial, industrial, transportation, or other applications where climate control is desired.

In the illustrated embodiment, a building 10 is air conditioned by a system that includes an HVAC unit 12. The building 10 may be a commercial structure or a residential structure. As shown, the HVAC unit 12 is disposed on the roof of the building 10; however, the HVAC unit 12 may be located in other equipment rooms or areas adjacent the building 10. The HVAC unit 12 may be a single package unit containing other equipment, such as a blower, integrated air handler, and/or auxiliary heating unit. In other embodiments, the HVAC unit 12 may be part of a split HVAC system, such as the system shown in FIG. 3, which includes an outdoor HVAC unit 58 and an indoor HVAC unit 56.

The HVAC unit 12 is an air cooled device that implements a refrigeration cycle to provide conditioned air to the building 10. Specifically, the HVAC unit 12 may include one or more heat exchangers across which an air flow is passed to condition the air flow before the air flow is supplied to the building. In the illustrated embodiment, the HVAC unit 12 is a rooftop unit (RTU) that conditions a supply air stream, such as environmental air and/or a return air flow from the building 10. After the HVAC unit 12 conditions the air, the air is supplied to the building 10 via ductwork 14 extending throughout the building 10 from the HVAC unit 12. For example, the ductwork 14 may extend to various individual floors or other sections of the building 10. In certain embodiments, the HVAC unit 12 may be a heat pump that provides both heating and cooling to the building with one refrigeration circuit configured to operate in different modes. In other embodiments, the HVAC unit 12 may include one or more refrigeration circuits for cooling an air stream and a furnace for heating the air stream.

A control device 16, one type of which may be a thermostat, may be used to designate the temperature of the conditioned air. The control device 16 also may be used to control the flow of air through the ductwork 14. For example, the control device 16 may be used to regulate operation of one or more components of the HVAC unit 12 or other components, such as dampers and fans, within the building 10 that may control flow of air through and/or from the ductwork 14. In some embodiments, other devices may be included in the system, such as pressure and/or temperature transducers or switches that sense the temperatures and pressures of the supply air, return air, and so forth. Moreover, the control device 16 may include computer systems that are integrated with or separate from other building control or monitoring systems, and even systems that are remote from the building 10.

Figure 2:
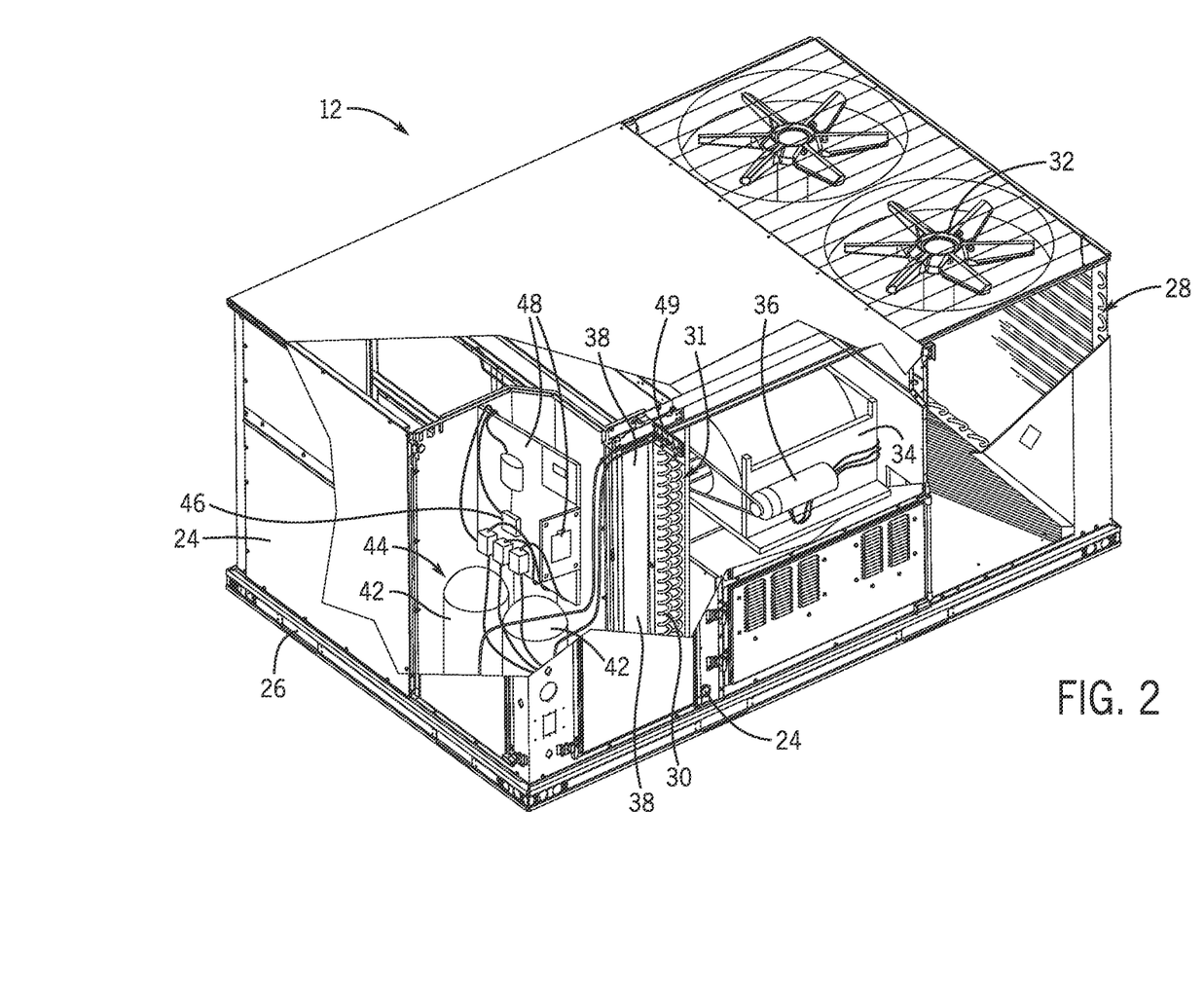
FIG. 2 is a perspective view of an embodiment of a packaged HVAC unit that may be used in the HVAC system of FIG. 1, in accordance with an aspect of the present disclosure.

FIG. 2 is a perspective view of an embodiment of the HVAC unit 12. In the illustrated embodiment, the HVAC unit 12 is a single package unit that may include one or more independent refrigeration circuits and components that are tested, charged, wired, piped, and ready for installation. The HVAC unit 12 may provide a variety of heating and/or cooling functions, such as cooling only, heating only, cooling with electric heat, cooling with dehumidification, cooling with gas heat, or cooling with a heat pump. As described above, the HVAC unit 12 may directly cool and/or heat an air stream provided to the building 10 to condition a space in the building 10.

As shown in the illustrated embodiment of FIG. 2, a cabinet 24 encloses the HVAC unit 12 and provides structural support and protection to the internal components from environmental and other contaminants. In some embodiments, the cabinet 24 may be constructed of galvanized steel and insulated with aluminum foil faced insulation. Rails 26 may be joined to the bottom perimeter of the cabinet 24 and provide a foundation for the HVAC unit 12. In certain embodiments, the rails 26 may provide access for a forklift and/or overhead rigging to facilitate installation and/or removal of the HVAC unit 12. In some embodiments, the rails 26 may fit into "curbs" on the roof to enable the HVAC unit 12 to provide air to the ductwork 14 from the bottom of the HVAC unit 12 while blocking elements such as rain from leaking into the building 10.

The HVAC unit 12 includes heat exchangers 28 and 30 in fluid communication with one or more refrigeration circuits. Tubes within the heat exchangers 28 and 30 may circulate refrigerant, such as R-410A, through the heat exchangers 28 and 30. The tubes may be of various types, such as multichannel tubes, conventional copper or aluminum tubing, and so forth. Together, the heat exchangers 28 and 30 may implement a thermal cycle in which the refrigerant undergoes phase changes and/or temperature changes as it flows through the heat exchangers 28 and 30 to produce heated and/or cooled air. For example, the heat exchanger 28 may function as a condenser where heat is released from the refrigerant to ambient air, and the heat exchanger 30 may function as an evaporator where the refrigerant absorbs heat to cool an air stream. In other embodiments, the HVAC unit 12 may operate in a heat pump mode where the roles of the heat exchangers 28 and 30 may be reversed. That is, the heat exchanger 28 may function as an evaporator and the heat exchanger 30 may function as a condenser. In further embodiments, the HVAC unit 12 may include a furnace for heating the air stream that is supplied to the building 10. While the illustrated embodiment of FIG. 2 shows the HVAC unit 12 having two of the heat exchangers 28 and 30, in other embodiments, the HVAC unit 12 may include one heat exchanger or more than two heat exchangers.

The heat exchanger 30 is located within a compartment 31 that separates the heat exchanger 30 from the heat exchanger 28. Fans 32 draw air from the environment through the heat exchanger 28. Air may be heated and/or cooled as the air flows through the heat exchanger 28 before being released back to the environment surrounding the HVAC unit 12. A blower assembly 34, powered by a motor 36, draws air through the heat exchanger 30 to heat or cool the air. The heated or cooled air may be directed to the building 10 by the ductwork 14, which may be connected to the HVAC unit 12. Before flowing through the heat exchanger 30, the conditioned air flows through one or more filters 38 that may remove particulates and contaminants from the air. In certain embodiments, the filters 38 may be disposed on the air intake side of the heat exchanger 30 to prevent contaminants from contacting the heat exchanger 30.

The HVAC unit 12 also may include other equipment for implementing the thermal cycle. Compressors 42 increase the pressure and temperature of the refrigerant before the refrigerant enters the heat exchanger 28. The compressors 42 may be any suitable type of compressors, such as scroll compressors, rotary compressors, screw compressors, or reciprocating compressors. In some embodiments, the compressors 42 may include a pair of hermetic direct drive compressors arranged in a dual stage configuration 44. However, in other embodiments, any number of the compressors 42 may be provided to achieve various stages of heating and/or cooling. As may be appreciated, additional equipment and devices may be included in the HVAC unit 12, such as a solid-core filter drier, a drain pan, a disconnect switch, an economizer, pressure switches, phase monitors, and humidity sensors, among other things.

The HVAC unit 12 may receive power through a terminal block 46. For example, a high voltage power source may be connected to the terminal block 46 to power the equipment. The operation of the HVAC unit 12 may be governed or regulated by a control board 48. The control board 48 may include control circuitry connected to a thermostat, sensors, and alarms. One or more of these components may be referred to herein separately or collectively as the control device 16. The control circuitry may be configured to control operation of the equipment, provide alarms, and monitor safety switches. Wiring 49 may connect the control board 48 and the terminal block 46 to the equipment of the HVAC unit 12.

Figure 3:
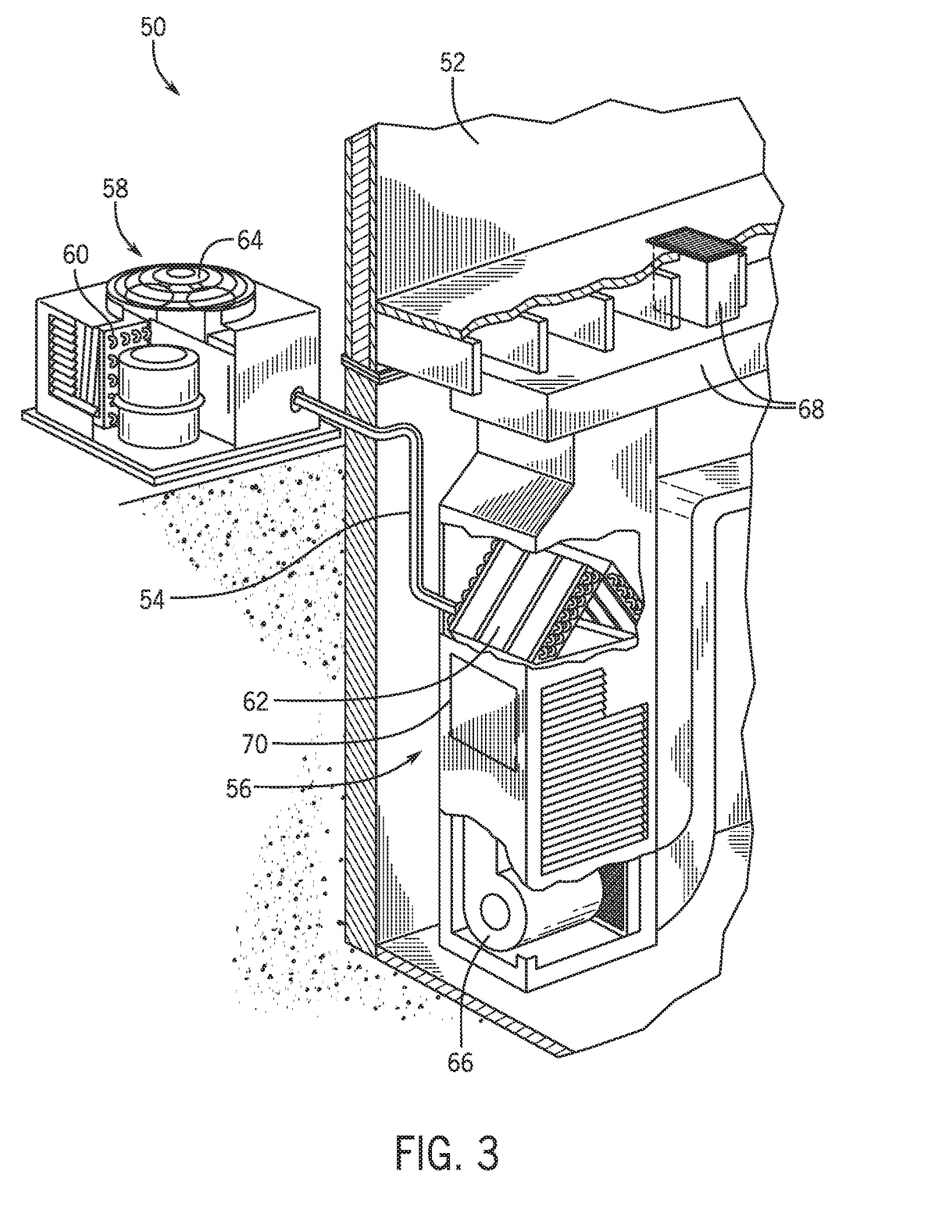
FIG. 3 is a cutaway perspective view of an embodiment of a residential, split HVAC system, in accordance with an aspect of the present disclosure.

FIG. 3 illustrates a residential heating and cooling system 50, also in accordance with present techniques. The residential heating and cooling system 50 may provide heated and cooled air to a residential structure, as well as provide outside air for ventilation and provide improved indoor air quality (IAQ) through devices such as ultraviolet lights and air filters. In the illustrated embodiment, the residential heating and cooling system 50 is a split HVAC system. In general, a residence 52 conditioned by a split HVAC system may include refrigerant conduits 54 that operatively couple the indoor unit 56 to the outdoor unit 58. The indoor unit 56 may be positioned in a utility room, an attic, a basement, and so forth. The outdoor unit 58 is typically situated adjacent to a side of residence 52 and is covered by a shroud to protect the system components and to prevent leaves and other debris or contaminants from entering the unit. The refrigerant conduits 54 transfer refrigerant between the indoor unit 56 and the outdoor unit 58, typically transferring primarily liquid refrigerant in one direction and primarily vaporized refrigerant in an opposite direction.

When the system shown in FIG. 3 is operating as an air conditioner, a heat exchanger 60 in the outdoor unit 58 serves as a condenser for re-condensing vaporized refrigerant flowing from the indoor unit 56 to the outdoor unit 58 via one of the refrigerant conduits 54. In these applications, a heat exchanger 62 of the indoor unit functions as an evaporator. Specifically, the heat exchanger 62 receives liquid refrigerant, which may be expanded by an expansion device, and evaporates the refrigerant before returning it to the outdoor unit 58.

The outdoor unit 58 draws environmental air through the heat exchanger 60 using a fan 64 and expels the air above the outdoor unit 58. When operating as an air conditioner, the air is heated by the heat exchanger 60 within the outdoor unit 58 and exits the unit at a temperature higher than it entered. The indoor unit 56 includes a blower or fan 66 that directs air through or across the indoor heat exchanger 62, where the air is cooled when the system is operating in air conditioning mode. Thereafter, the air is passed through ductwork 68 that directs the air to the residence 52. The overall system operates to maintain a desired temperature as set by a system controller. When the temperature sensed inside the residence 52 is higher than the set point on the thermostat, or the set point plus a small amount, the residential heating and cooling system 50 may become operative to refrigerate additional air for circulation through the residence 52. When the temperature reaches the set point, or the set point minus a small amount, the residential heating and cooling system 50 may stop the refrigeration cycle temporarily. The outdoor unit 58 includes a reheat system in accordance with present embodiments.

The residential heating and cooling system 50 may also operate as a heat pump. When operating as a heat pump, the roles of heat exchangers 60 and 62 are reversed. That is, the heat exchanger 60 of the outdoor unit 58 will serve as an evaporator to evaporate refrigerant and thereby cool air entering the outdoor unit 58 as the air passes over the outdoor heat exchanger 60. The indoor heat exchanger 62 will receive a stream of air blown over it and will heat the air by condensing the refrigerant.

In some embodiments, the indoor unit 56 may include a furnace system 70. For example, the indoor unit 56 may include the furnace system 70 when the residential heating and cooling system 50 is not configured to operate as a heat pump. The furnace system 70 may include a burner assembly and heat exchanger, among other components, inside the indoor unit 56. Fuel is provided to the burner assembly of the furnace 70 where it is mixed with air and combusted to form combustion products. The combustion products may pass through tubes or piping in a heat exchanger, separate from heat exchanger 62, such that air directed by the blower 66 passes over the tubes or pipes and extracts heat from the combustion products. The heated air may then be routed from the furnace system 70 to the ductwork 68 for heating the residence 52.

Figure 4:
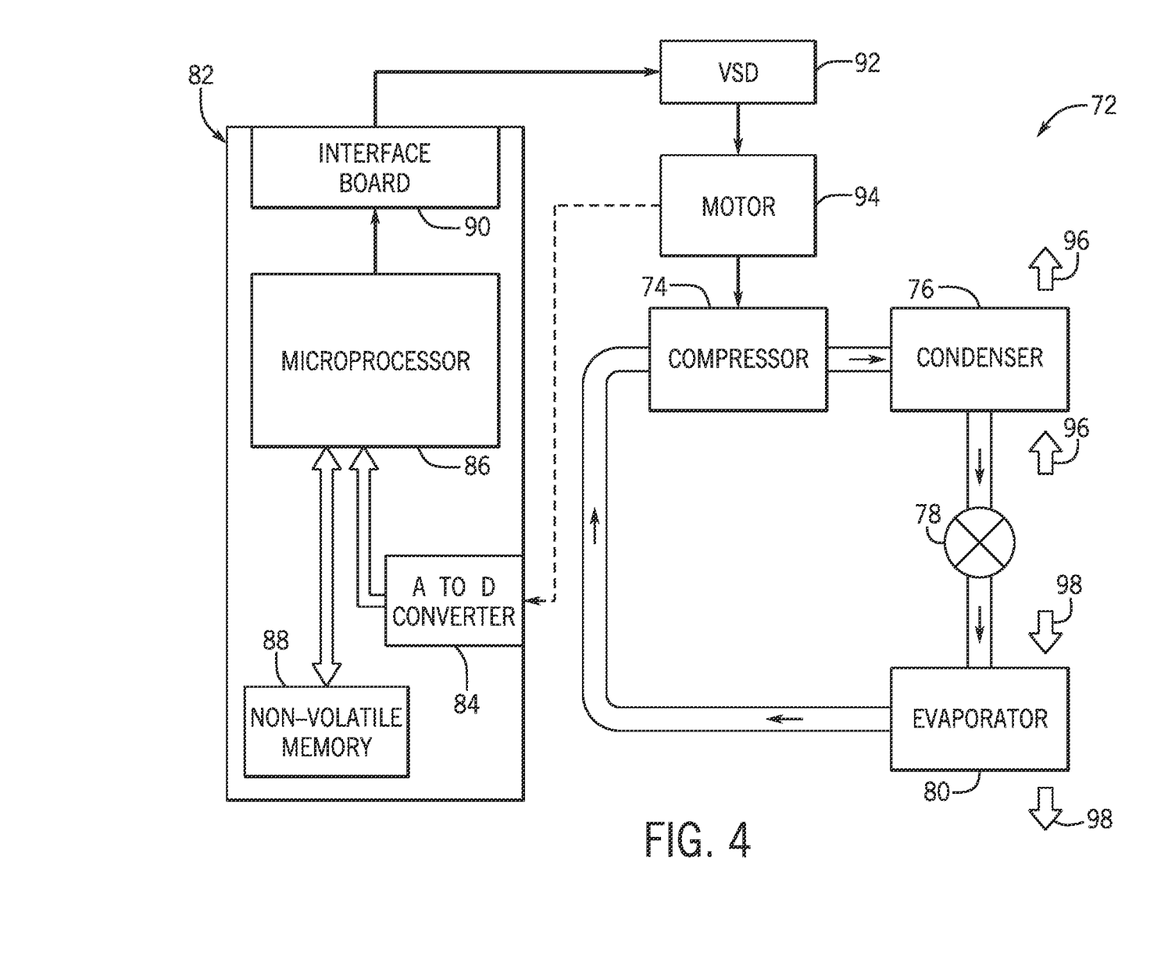
FIG. 4 is a schematic of an embodiment of a vapor compression system that can be used in any of the systems of FIGS. 1-3, in accordance with an aspect of the present disclosure.

FIG. 4 is an embodiment of a vapor compression system 72 that can be used in any of the systems described above. The vapor compression system 72 may circulate a refrigerant through a circuit starting with a compressor 74. The circuit may also include a condenser 76, an expansion valve(s) or device(s) 78, and an evaporator 80. The vapor compression system 72 may further include a control panel 82 that has an analog to digital (A/D) converter 84, a microprocessor 86, a non-volatile memory 88, and/or an interface board 90. The control panel 82 and its components may function to regulate operation of the vapor compression system 72 based on feedback from an operator, from sensors of the vapor compression system 72 that detect operating conditions, and so forth.

In some embodiments, the vapor compression system 72 may use one or more of a variable speed drive (VSDs) 92, a motor 94, the compressor 74, the condenser 76, the expansion valve or device 78, and/or the evaporator 80. The motor 94 may drive the compressor 74 and may be powered by the variable speed drive (VSD) 92. The VSD 92 receives alternating current (AC) power having a particular fixed line voltage and fixed line frequency from an AC power source, and provides power having a variable voltage and frequency to the motor 94. In other embodiments, the motor 94 may be powered directly from an AC or direct current (DC) power source. The motor 94 may include any type of electric motor that can be powered by a VSD or directly from an AC or DC power source, such as a switched reluctance motor, an induction motor, an electronically commutated permanent magnet motor, or another suitable motor.

The compressor 74 compresses a refrigerant vapor and delivers the vapor to the condenser 76 through a discharge passage. In some embodiments, the compressor 74 may be a centrifugal compressor. The refrigerant vapor delivered by the compressor 74 to the condenser 76 may transfer heat to a fluid passing across the condenser 76, such as ambient or environmental air 96. The refrigerant vapor may condense to a refrigerant liquid in the condenser 76 as a result of thermal heat transfer with the environmental air 96. The liquid refrigerant from the condenser 76 may flow through the expansion device 78 to the evaporator 80.

The liquid refrigerant delivered to the evaporator 80 may absorb heat from another air stream, such as a supply air stream 98 provided to the building 10 or the residence 52. For example, the supply air stream 98 may include ambient or environmental air, return air from a building, or a combination of the two. The liquid refrigerant in the evaporator 80 may undergo a phase change from the liquid refrigerant to a refrigerant vapor. In this manner, the evaporator 80 may reduce the temperature of the supply air stream 98 via thermal heat transfer with the refrigerant. Thereafter, the vapor refrigerant exits the evaporator 80 and returns to the compressor 74 by a suction line to complete the cycle.

In some embodiments, the vapor compression system 72 may further include a reheat coil. In the illustrated embodiment, the reheat coil is represented as part of the evaporator 80. The reheat coil is positioned downstream of the evaporator heat exchanger relative to the supply air stream 98 and may reheat the supply air stream 98 when the supply air stream 98 is overcooled to remove humidity from the supply air stream 98 before the supply air stream 98 is directed to the building 10 or the residence 52.

It should be appreciated that any of the features described herein may be incorporated with the HVAC unit 12, the residential heating and cooling system 50, or other HVAC systems. Additionally, while the features disclosed herein are described in the context of embodiments that directly heat and cool a supply air stream provided to a building or other load, embodiments of the present disclosure may be applicable to other HVAC systems as well. For example, the features described herein may be applied to mechanical cooling systems, free cooling systems, chiller systems, or other heat pump or refrigeration applications.

As briefly discussed above, embodiments of the present disclosure are directed to a control system for an HVAC system including an improved wiring arrangement that enables supply of electrical signals to different components of the HVAC system in parallel with one another. In the manner described in detail below, the present techniques enable improved operation of the HVAC system to provide a supply air flow to the conditioned space. While the following discussion describes the present techniques incorporated with a split HVAC system, such as the residential heating and cooling system 50, it should be appreciated that other embodiments of HVAC systems, such as packaged units, rooftop units, and so forth, may similarly benefit from the disclosed features.

Figure 5:
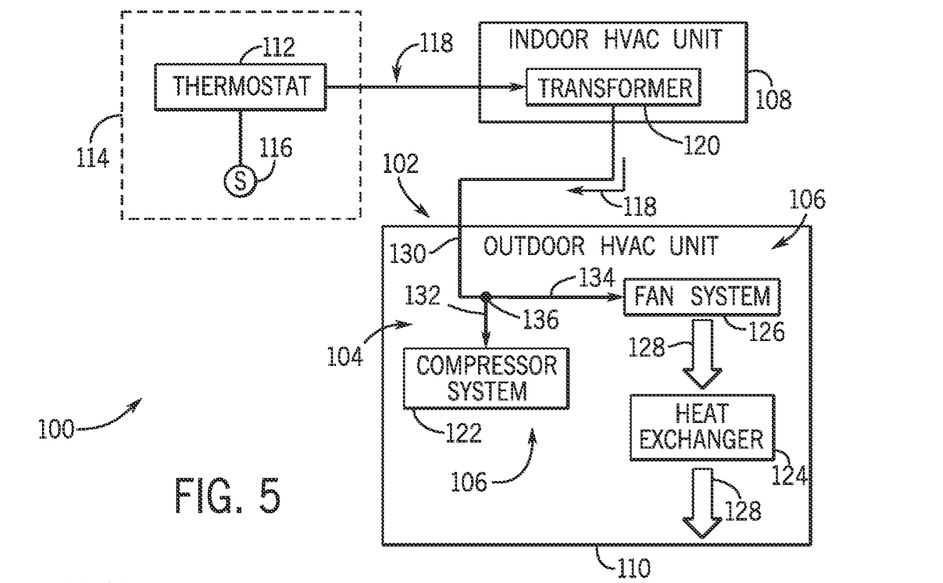
FIG. 5 is a schematic of an embodiment of an HVAC system including an outdoor unit having an improved wiring arrangement, in accordance with an aspect of the present disclosure.

To provide context for the following discussion, FIG. 5 is a schematic of an embodiment of an HVAC system 100 (e.g., an air conditioner, a heat pump) that includes a control system 102 with a wiring arrangement 104 (e.g., electrical path arrangement, electrical communication configuration, electrical arrangement, electrical communication system) configured to individually and separately direct electrical signals to HVAC components 106 of the HVAC system 100 in parallel with one another. The HVAC system 100 may include one or more components of the HVAC unit 12, one or more components of the residential heating and cooling system 50, a chiller system, and/or another suitable HVAC system. In the illustrated embodiment, the HVAC system 100 includes an indoor HVAC unit 108, which may be positioned within a building, and an outdoor HVAC unit 110, which may be positioned external to the building.

The HVAC system 100 also includes a thermostat 112 (e.g., user interface, controller) disposed within a conditioned space 114 serviced by the HVAC system 100. As briefly discussed above, the thermostat 112 may be configured to receive a user input indicative of a set point temperature (e.g., a desired temperature) for the conditioned space 114. The thermostat 112 may also be configured to receive data or feedback indicative of a measured temperature associated with the conditioned space 114. In particular, the thermostat 112 may be communicatively coupled to a sensor 116 configured to detect the measured temperature. In some embodiments, the sensor 116 may be positioned within the conditioned space 114 and be configured to detect a temperature (e.g., air temperature) within the conditioned space. In other embodiments, the sensor 116 may be positioned within ductwork or within the HVAC system 100 and be configured to detect a temperature of return air received by the HVAC system 100 (e.g., the indoor HVAC unit 108) from the conditioned space 114.

In operation, the thermostat 112 may compare the set point temperature (e.g., received via user input) and the measured temperature detected by the sensor 116. Based on a determination that the measured temperature deviates from the set point temperature (e.g., by a threshold percentage, by a threshold amount), the thermostat 112 may output a signal 118 (e.g., an electrical signal, a 24 volt [V] signal, call for conditioning signal, call for cooling signal) indicative of a call for conditioning. The signal 118 may be directed to one or more components of the HVAC system 100 communicatively coupled to the thermostat 112 to initiate operation of the HVAC system 100 to provide a supply air flow to the conditioned space 114 and cause the measured temperature to approach the set point temperature. In some embodiments, the signal 118 output by the thermostat 112 may be directed to the indoor HVAC unit 108, as shown in the illustrated embodiment, to the outdoor HVAC unit 110, or both.

As shown, the signal 118 may be received by a transformer 120 of the indoor HVAC unit 108. In other embodiments, the signal 118 may be received by another component of the indoor HVAC unit 108 communicatively coupled to the thermostat 112, such as a furnace or a terminal block. Thereafter, the indoor HVAC unit 108 may direct the signal 118 to the outdoor HVAC unit 110. At the outdoor HVAC unit 110, the signal 118 may be further directed to one or more of the HVAC components 106 disposed therein, as described in further detail below.

The outdoor HVAC unit 110 includes a compressor system 122 and a heat exchanger 124. As similarly described in detail above, the compressor system 122 and the heat exchanger 124 may be disposed along a vapor compression circuit (e.g., vapor compression system 72) configured to circulate a working fluid (e.g., a refrigerant) therethrough. For example, in a cooling operating mode of the HVAC system 100, the compressor system 122 may discharge the working fluid to the heat exchanger 124, and the heat exchanger 124 may operate as a condenser to cool the working fluid. To this end, the outdoor HVAC unit 110 includes a fan system 126 configured to direct an air flow 128 (e.g., ambient air) across the heat exchanger 124 to place the air flow 128 and the working fluid within the heat exchanger 124 in a heat exchange relationship. In some embodiments, the fan system 126 may be configured to blow (e.g., push) the air flow 128 across the heat exchanger 124. In other embodiments, the fan system 126 may be configured to draw (e.g., pull) the air flow 128 across the heat exchanger 124. In this way, heat may be transferred from the working fluid to the air flow 128, thereby cooling the working fluid.

Operation of the compressor system 122 and the fan system 126 may be initiated based on receipt of the signal 118 (e.g., 24V signal) from the indoor HVAC unit 108 (e.g., from the thermostat 112). In accordance with present techniques, the control system 102 (e.g., the wiring arrangement 104) is configured to receive the signal 118 from the indoor HVAC unit 108 and transmit the signal 118 to the compressor system 122 and to the fan system 126 individually and in parallel with one another. For example, the wiring arrangement 104 includes a first electrical path 130 (e.g., common wire, first electrical circuit, Y1 wire, cooling call wire) configured to receive the signal 118 from the indoor HVAC unit 108. The first electrical path 130 is electrically (e.g., communicatively) coupled to a second electrical path 132 (e.g., second electrical circuit) and a third electrical path 134 (e.g., third electrical circuit) at a node or junction 136. The second electrical path 132 and the third electrical path 134 extend from the first electrical path 130 in parallel with one another. In particular, the second electrical path 132 extends from the first electrical path 130 to the compressor system 122, and the third electrical path 134 extends from the first electrical path 130 to the fan system 126. Thus, the wiring arrangement 104 is configured to direct the signal 118 from the first electrical path 130 toward the compressor system 122 and the fan system 126 separately and independently from one another (e.g., in parallel). As described in further detail below, the disclosed wiring arrangement 104 enables improved operation of the HVAC system 100.

Figure 6:
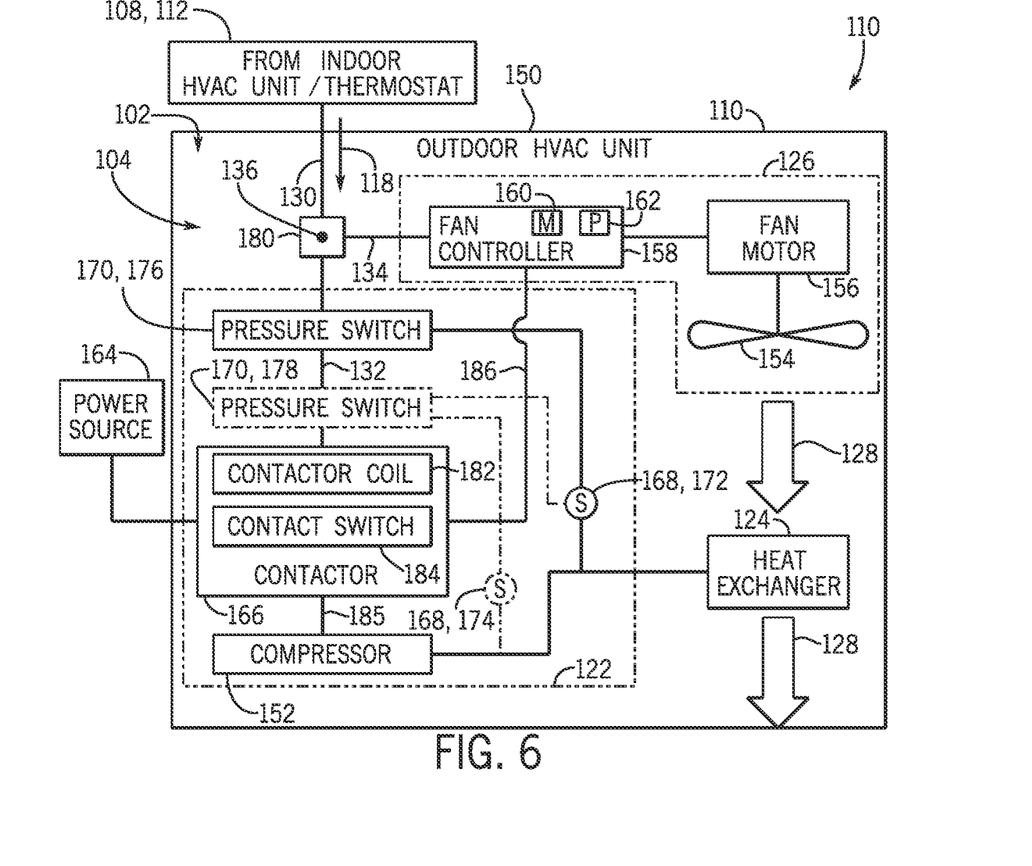
FIG. 6 is a schematic of an embodiment of an outdoor unit of an HVAC system having an improved wiring arrangement, in accordance with an aspect of the present disclosure.

FIG. 6 is a schematic of an embodiment of the outdoor HVAC unit 110 of the HVAC system 100, illustrating the compressor system 122, the fan system 126, and the control system 102 having the wiring arrangement 104, in accordance with the present techniques. In the illustrated embodiment, the outdoor HVAC unit 110 includes a housing 150 with the compressor system 122, the fan system 126, and the control system 102 disposed therein. The compressor system 122 includes a compressor 152 configured to direct a working fluid (e.g., a refrigerant) to the heat exchanger 124. For example, the heat exchanger 124 may be a condenser configured to cool and condense the working fluid. In particular, the heat exchanger 124 may place the working fluid in a heat exchange relationship with the air flow 128, such as an ambient air flow, directed across the heat exchanger 124. To this end, the fan system 126 includes a fan 154 and a motor 156 (e.g., fan motor) configured to drive rotation of the fan 154. In this way, the fan 154 may force the air flow 128 across the heat exchanger 124.

The fan system 126 also includes a fan controller 158 (e.g., controller, automation controller, control system, control device) configured to regulate operation of the motor 156 and the fan 154. For example, the fan controller 158 may be configured to regulate supply of power to the motor 156, adjust operation of the motor 156 to control a speed of the fan 154, and/or other operating parameters of the fan system 126. In some embodiments, the motor 156 may be a fixed speed motor. In other embodiments, the motor 156 may be a variable speed motor, and the fan system 126 (e.g., fan controller 158) may include a variable speed drive configured to adjust a speed of the motor 156, such as based on varying a frequency of power supplied to the motor 156.

The fan controller 158 may also include a memory 160 and processing circuitry 162. The processing circuitry 162 may include one or more microprocessors, which may execute software (e.g., executable instructions, code) for controlling components of the fan system 126. The processing circuitry 162 may include multiple microprocessors, one or more "general-purpose" microprocessors, one or more special-purpose microprocessors, and/or one or more application specific integrated circuits (ASICS), or some combination thereof. For example, the processing circuitry 162 may include one or more reduced instruction set (RISC) processors.

The memory 160 (e.g., a memory device) may store information, such as instructions, control software, look up tables, configuration data, code, etc. The memory 160 may include a volatile memory, such as random access memory (RAM), and/or a nonvolatile memory, such as read-only memory (ROM). The memory 160 may store a variety of information and may be used for various purposes. For example, the memory 160 may store processor-executable instructions including firmware or software for the processing circuitry 162 to execute, such as instructions for controlling components of the fan system 126. In some embodiments, the memory 160 is a tangible, non-transitory, machine-readable medium that may store machine-readable instructions for the processing circuitry 162 to execute. The memory 160 may include ROM, flash memory, a hard drive, or any other suitable optical, magnetic, or solid-state storage medium, or a combination thereof. The memory 160 may store data, instructions, and any other suitable information. In some embodiments, the memory 160 may store instructions to enable control of the motor 156, such as adjusting a speed of the motor 156 based on data or feedback received by the fan controller 158. It should be noted that the fan controller 158 may be a dedicated controller of the fan system 126, or the fan controller 158 may be a component of another controller or control system (e.g., control system 102). For example, the fan controller 126 may be a component of the control board 48, the control panel 82, and so forth.

The outdoor HVAC unit 110 is configured to receive power (e.g., electrical power) from a power source 164. The power source 164 may be a utility grid, a battery, a generator, a solar panel, or other suitable source of electrical power. As shown, the outdoor HVAC unit 110 includes a contactor 166 (e.g., an electrical switch) configured to receive power from the power source 164. The contactor 166 is configured to enable supply of power to the compressor 152 and to the fan motor 156. Operation of the contactor 166 is described in further detail below.

As described above, operation of components of the outdoor HVAC unit 108, such as the compressor 152 and the fan motor 156, may be initiated based on receipt of the signal 118 (e.g., 24V signal) from the indoor HVAC unit 108 and/or the thermostat 112. Indeed, the signal 118 may be indicative of a call for conditioning (e.g., call for cooling), and the outdoor HVAC unit 110 may operate to enable supply of a conditioned air flow (e.g., cooled air, heated air) to the conditioned space 114. In general, in response to receipt of the signal 118 by the contactor 166, the contactor 166 may enable supply of power to the compressor 152, and the compressor 152 may operate to circulate a refrigerant or other working fluid through a vapor compression circuit (e.g., vapor compression system 72) of the HVAC system 100. The compressor 152 may discharge refrigerant to flow through the heat exchanger 124 of the outdoor HVAC unit 110, and the heat exchanger 124 may operate to cool the refrigerant. In particular, the fan motor 156 may drive rotation of the fan 154 to force the air flow 128 across the heat exchanger 124 and cool the refrigerant flowing through the heat exchanger 124.

In some circumstances, operation of the compressor 152 may be suspended, such as based on one or more operating parameters or operating conditions of the HVAC system 100. For example, during high ambient conditions (e.g., a temperature of ambient air and/or the air flow 128 above a threshold value), a pressure of the refrigerant discharged by the compressor 152 may exceed a desired (e.g., predetermined) value, and it may be desirable to suspend operation of the compressor 152 to mitigate undesired operation of the HVAC system 100 and/or potential wear or degradation of the HVAC system 100. Accordingly, the outdoor HVAC unit 110 may include a sensor 168 (e.g., a pressure sensor) configured to detect an operating parameter of the refrigerant (e.g., upstream of the compressor, downstream of the compressor, relative to a flow direction of refrigerant). In the illustrated embodiment, the sensor 168 is configured to detect a pressure of the refrigerant discharged by the compressor 152. The sensor 168 may be communicatively coupled to a pressure switch 170 that is disposed along the second electrical path 132. In some embodiments, the sensor 168 and the pressure switch 170 may be integrated with one another as a common component or device. Based on a determination (e.g., feedback or data from the sensor 168) that the pressure of the refrigerant exceeds a threshold (e.g., threshold value, predetermined pressure value), the pressure switch 170 may open or trip, thereby interrupting transmission of the signal 118 to the contactor 166 and thereby interrupting supply of power (e.g., 230V current) to the compressor 152. In some embodiments, suspended transmission of the signal 118 to the contactor 166 may cause the contactor 116 to de-energize for a predetermined or threshold time period (e.g., 5 seconds, 10 seconds, 20 seconds, 30 seconds, or other suitable time period).

While some embodiments of the outdoor HVAC unit 110 may include one sensor 168, other embodiments may include multiple sensors 168, such as a first sensor 172 and a second sensor 174, configured to detect one or more operating parameters of the refrigerant circulated by the compressor 152. Similarly, the outdoor HVAC unit 110 may include one pressure switch 170 or multiple pressure switches 170. In the illustrated embodiment, the first sensor 172 is communicatively coupled to a first pressure switch 176 (e.g., high pressure switch), and the second sensor 174 is communicatively coupled to a second pressure switch 178 (e.g., low pressure switch), with each pressure switch 170 disposed along the second electrical path 132. The first pressure switch 176 may open in response to detection of a refrigerant pressure above a first threshold value by the first sensor 172, and the second pressure switch 178 may open in response to detection of a refrigerant pressure below a second threshold value that is lower than the first threshold value. Thus, operation of the compressor 152 may be suspended in response to detection of refrigerant pressure outside of a desired pressure range. It should be appreciated that the sensors 168 may be configured to detect operating parameters of the refrigerant other than pressure, such as temperature, flow rate, and so forth, and the pressure switches 170 may be tripped or opened based on feedback indicative of the operating parameters.

In existing systems, interrupting transmission of the signal 118 to the contactor 166 (e.g., via tripping or opening of one of the pressure switches 170) may also cause supply of power to the fan system 126 to be interrupted, which therefore causes operation of the fan motor 156 to be suspended. Unfortunately, the pressure switch 170 may remain open and/or may repeatedly close and open until the sensor 168 detects an operating parameter of the refrigerant above and/or below a corresponding threshold value and/or within a desired operating parameter range. Unfortunately, such configurations of existing systems may cause inefficient and/or delayed operation of the HVAC system 100 to provide a conditioned air flow in response to a call for conditioning.

Accordingly, present embodiments include the wiring arrangement 104 configured to direct the signal 118 received at the outdoor HVAC unit 110 to the fan system 126 and the compressor system 122 separately from one another. Specifically, the wiring arrangement 104 is configured to direct the signal 118 to the compressor system 122 and the fan system 126 in parallel. To this end, the wiring arrangement 104 includes the first electrical path 130 configured to direct the signal 118 to the junction 136, and the second electrical path 132 and the third electrical path 134 extending from the junction 136. The second electrical path 132 is configured to direct the signal 118 toward the compressor system 122 to enable operation of the compressor 152, and the third electrical path 134 is configured to direct the signal 118 toward the fan system 126 to enable operation of the fan motor 156 and the fan 154. In this way, the wiring arrangement 104 is configured to direct the signal 118 to the compressor system 122 and the fan system 126 separately and in parallel. In some embodiments, the wiring arrangement 104 may include a harness 180 (e.g., wire harness, wire terminal, crimping apparatus, wire splitter) configured to enable electrical coupling of the first electrical path 130, the second electrical path 132, and the third electrical path 134 at the junction 136 (e.g., node).

As mentioned above, the second electrical path 132 is configured to direct the signal 118 to the compressor system 122. Specifically, the second electrical path 132 may extend to the contactor 166 of the compressor system 122. In the illustrated embodiment, the contactor 166 includes a contactor coil 182 and a contact switch 184 (e.g., electrical switch). The contactor coil 182 is configured to receive the signal 118 (e.g., 24V signal) via the second electrical path 132 and to be energized based on receipt of the signal 118. Energization of the contactor coil 182 causes the contact switch 184 to close, which enables supply of power from the power source 164 to the compressor 152 via the contact switch 184 and via a power line 185 (e.g., high voltage wiring, one or more power wires). For example, upon energization, the contactor coil 182 may cause (e.g., magnetically cause, physically cause) contacts of the contact switch 184 to close and establish a flow path (e.g., electrical current path) to enable supply of power from the power source 164 to the compressor 152 via the contactor 166.

The third electrical path 134 enables transmission of the signal 118 to the fan system 126. In particular, the third electrical path 134 may direct the signal 118 from the junction 136 to the fan controller 158 of the fan system 126. In response to receipt of the signal 118, the fan controller 158 may enable supply of power to the fan motor 156, thereby causing the fan motor 156 to drive rotation of the fan 154 and direct the air flow 128 across the heat exchanger 124. For example, receipt of the signal 118 may cause the fan controller 158 to draw power from the contactor 166 (e.g., power supplied to the contactor 166 by the power source 164) to direct the power to the fan motor 156. In the illustrated embodiment, an electrical power path 186 (e.g., wiring, conductive path) extends from the contactor 166 to the fan controller 158. The fan controller 158 may receive power (e.g., 230V current) from the contactor 166 and, in some embodiments, may condition the power for supply to the fan motor 156. For example, the fan controller 158 may include a rectifier configured to convert alternating current (AC) received via the electrical power path 186 to direct current (DC) to be supplied to the fan motor 156.

The fan controller 158 may continue to receive power from the contactor 166 and provide power to the fan motor 156 in response to continuous or continual receipt of the signal 118 (e.g., constant receipt of the signal 118, receipt of the signal 118 at predetermined intervals, etc.). Accordingly, the fan controller 158 may suspend supply of power to the fan motor 156 based on non-receipt of the signal 118. However, in accordance with presently disclosed techniques, the wiring arrangement 104 is configured to transmit the signal 118 to the fan controller 158 independently from transmission of the signal 118 to the contactor 166. Thus, circumstances in which the pressure switch 170 is tripped (e.g., opened) based on an operating parameter detected by one of the sensor 168 (e.g., thereby interrupting transmission of the signal 118 to the contactor 166 along the second electrical path 132) may not interrupt transmission of the signal 118 to the fan controller 158. In this way, operation of the fan system 122 may continue (e.g., the air flow 128 may be directed across the heat exchanger 124) even when operation of the compressor 152 is suspended (e.g., due to tripping of the pressure switch 170). In other words, operation of the fan system 122 during time periods in which the signal 118 is transmitted to the outdoor HVAC unit 110 is not interrupted, suspended, and/or re-started in circumstances that cause the pressure switch 170 to trip and suspend operation of the compressor 152. Indeed, in some embodiments, the fan motor 156 may be associated with an initialization or "ramp up" time period during which the fan motor 156 accelerates from non-operation (e.g., a resting or idle state) to an upper speed limit (e.g., full speed). By mitigating interrupted transmission of the signal 118 to the fan controller 158 via the wiring arrangement 104, re-starting of the fan motor 156, and therefore repeated instances of the initialization time period, are avoided.

Further, continued operation of the fan system 122 to generate and direct the air flow 128 across the heat exchanger 124 may cause the pressure of the working fluid (e.g., refrigerant) within the heat exchanger 124 to reduce (e.g., via cooling of the working fluid by the air flow 128), which may remedy a condition that causes the pressure switch 170 to trip and interrupt supply of power to the compressor 152. By avoiding suspended and re-started operation of the fan system 122 (e.g., during tripping of the pressure switch 170), the wiring arrangement 104 enables improved (e.g., more efficient) operation of the outdoor HVAC unit 110 and the HVAC system 100 generally. Additionally, continued operation of the fan system 122 during time periods in which one of the pressure switches 170 is tripped may enable more rapid rectification of conditions that initially cause tripping of the pressure switch 170. Thus, the presently disclosed techniques enable improved and more efficient operation of the HVAC system 100 to generate and provide a supply air flow to a conditioned space (e.g., in response to a call for conditioning indicated by the signal 118).

Figure 7:
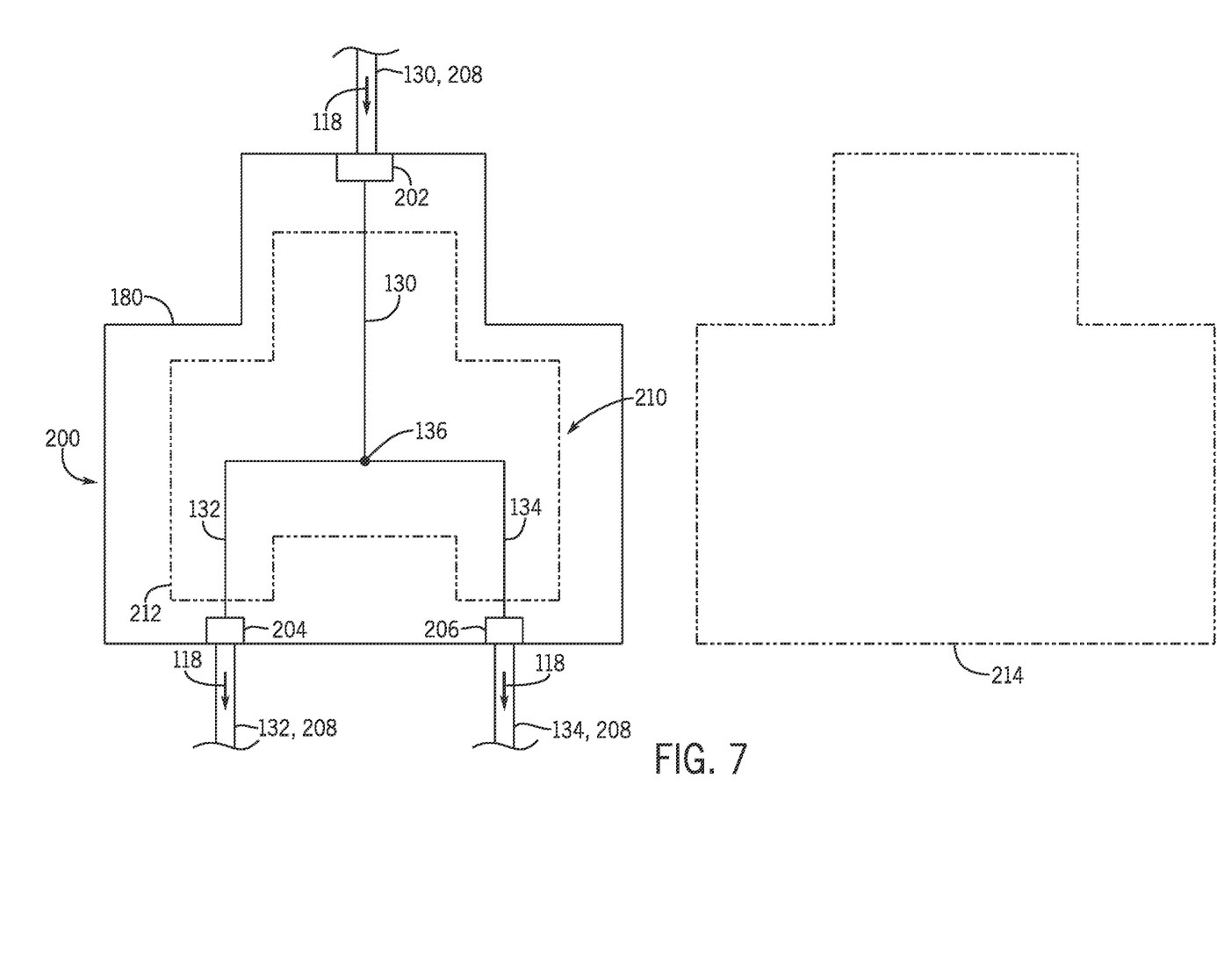
FIG. 7 is a schematic of an embodiment of a harness for a wiring arrangement of an HVAC system, in accordance with an aspect of the present disclosure.

As mentioned above, the first electrical path 130, the second electrical path 132, and the third electrical path 134 may be electrically coupled to one another at the junction 136, and the junction 136 may be housed or contained within the harness 180. For example, respective wires or cables may at least partially define each of the first electrical path 130, the second electrical path 132, and the third electrical path 134, and the wires may be electrically coupled to one another via the harness 180 (e.g., wire harness, wire splitter). FIG. 7 is a schematic of an embodiment of the harness 180, illustrated electrical coupling of the first electrical path 130, the second electrical path 132, and the third electrical path 134 within the harness 180.

In the illustrated embodiment, the harness 180 includes a main body 200 defining a first inlet 202 (e.g., first input, aperture, opening), a second inlet 204 (e.g., first input, aperture, opening), and a third inlet 206 (e.g., first input, aperture, opening). The main body 200 may be formed from any suitable material, such as plastic, rubber, another polymer, or other suitable (e.g., non-conductive) material. Each inlet 202, 204, 206 is configured to receive a respective wire 208 associated with one of the first electrical path 130, the second electrical path 132, and the third electrical path 134. The wires 208 of the first electrical path 130, the second electrical path 132, and the third electrical path 134 may extend into an interior cavity 210 of the main body 200 to be electrically coupled to one another.

In some embodiments, the wires 208 corresponding to the first electrical path 130, the second electrical path 132, and the third electrical path 134 may be directly (e.g., physically) coupled to one another to establish electrical communication therebetween and enable transmission of the signal 118 from the first electrical path 130 to the second electrical path 132 and to the third electrical path 134. In other embodiments, the first electrical path 130, the second electrical path 132, and the third electrical path 134 may be electrically coupled to one another in another suitable manner. For example, a contact plate 212 (e.g., conductive plate, conductive surface) may be disposed within the interior cavity 210 of the main body 200, and each wire 208 associated with the first electrical path 130, the second electrical path 132, and the third electrical path 134 may be coupled (e.g., fixed, attached) to the contact plate 212 to establish electrical communication between the wires 208. The wires 208 may be secured to the contact plate 212 and/or to one another via crimping, soldering, or other suitable physical connection. Further, in some embodiments, the harness 180 may include a cover 214 (e.g., a removable cover) that may be releasably secured to the main body 200. That is, the cover 214 may be selectively removed from the main body 200 to expose the interior cavity 208 and enable positioning, securement, and/or replacement of the wires 208 within the main body 200 to establish electrical communication therebetween. In an assembled configuration, the cover 214 may be secured to the main body 200 to enclose the interior cavity 210. In this way, the electrical coupling of the first electrical path 130, the second electrical path 132, and the third electrical path 134 (e.g., the respective wires 208) may be maintained and protected.

It should be appreciated that other embodiments of the wiring arrangement 104 may include additional or alternative features to enable and establish electrical communication of the first electrical path 130, the second electrical path 132, and the third electrical path 134 in accordance with the techniques described herein. For example, the wiring arrangement 104 may include wire nuts, heat shrink wrap, twisted wire 208 connections, soldered wire 208 connections, alligator clips, pin connectors, binding posts, screw terminals, ring terminals, spade terminals, other suitable electrical coupling component, and/or any combination thereof, to enable implementation of the wiring arrangement 104 and the techniques described herein. For example, the wires 208 may be directly crimped or soldered to one another to form the junction 136, the junction 136 may be enclosed or encased in a heat shrink material, and the junction 136 may be enclosed within the harness 180.

As described in detail above, embodiments of the present disclosure directed to a wiring arrangement of an HVAC system that is configured to direct a signal, such as an electrical signal indicative of a call for conditioning (e.g., cooling) to a fan system and a compressor system separately, independently from one another, and/or in parallel with one another. For example, the wiring arrangement may be configured to direct the signal from an indoor HVAC unit and/or a thermostat of the HVAC system along a first electrical path. The first electrical path is electrically coupled to a second electrical path extending to the compressor system and to a third electrical path extending to the fan system. Thus, the signal may cause the compressor system and the fan system to initialize operation independently. In this way, an interruption in transmission of the signal to one of the compressor system and the fan system may not result in an interruption in transmission of the signal to the other of the compressor system and the fan system. For example, if a pressure or other switch disposed along the second electrical path is tripped, thereby causing interruption in transmission of the signal to the compressor system, the fan system may nevertheless continue to receive the signal and therefore continue to operate. In this way, the present techniques enable the HVAC system to operate more efficiently to provide a supply air flow to a conditioned space and to rectify conditions that may cause interruption in transmission of the signal to the compressor system.

While only certain features and embodiments have been illustrated and described, many modifications and changes may occur to those skilled in the art, such as variations in sizes, dimensions, structures, shapes and proportions of the various elements, values of parameters, such as temperatures and pressures, mounting arrangements, use of materials, colors, orientations, and so forth, without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the disclosure.

Furthermore, in an effort to provide a concise description of the exemplary embodiments, all features of an actual implementation may not have been described, such as those unrelated to the presently contemplated best mode, or those unrelated to enablement. It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A control system for a heating, ventilation, and air conditioning (HVAC) system, comprising:
    a contactor configured to close and enable supply of power to a compressor of the HVAC system in response to receipt of an electric current;
    a first electrical circuit configured to direct the electric current to the contactor;
    a second electrical circuit configured to direct the electric current to bypass the contactor and direct the electric current toward a fan controller of the HVAC system; and
    a common wire configured to direct the electric current to a node housed within a wire harness, wherein the first electrical circuit is configured to direct the electric current from the node to the contactor, and the second electrical circuit is configured to direct the electric current from the node to the fan controller.

2. The control system of claim 1, wherein the contactor, the first electrical circuit, and the second electrical circuit are disposed within an outdoor unit of the HVAC system.

3. The control system of claim 2, wherein the common wire is configured to direct the electric current to the node from an indoor unit of the HVAC system.

4. The control system of claim 1, comprising a pressure switch disposed along the first electrical circuit, wherein the pressure switch is configured to open and block flow of the electric current to the contactor in response to feedback from a pressure sensor.

5. The control system of claim 4, comprising the pressure sensor, wherein the pressure sensor is configured to detect a pressure of a working fluid of the HVAC system.

6. The control system of claim 5, wherein the pressure sensor is disposed along a working fluid circuit of the HVAC system, and the pressure is a discharge pressure of the working fluid discharged by the compressor.

7. The control system of claim 6, wherein the pressure switch is configured to open in response to the discharge pressure exceeding a first threshold pressure value, in response to the discharge pressure being below a second threshold pressure value, or both.

8. The control system of claim 1, comprising the fan controller, wherein the fan controller is configured to close and enable supply of power to a fan motor based on receipt of the electric current.

9. The control system of claim 1, wherein the electric current is indicative of a call for cooling.

10. A heating, ventilation, and air conditioning (HVAC) system, comprising:
    a compressor configured to discharge a working fluid toward a heat exchanger;
    a contactor configured to enable a supply of power to the compressor in response to receipt of an electric current by the contactor via a first electrical circuit, wherein the supply of power comprises a voltage greater than a voltage associated with the electric current;
    a fan controller configured to operate a fan to force an air flow across the heat exchanger, wherein the fan controller is configured to enable an additional supply of power to a fan motor configured to drive the fan based on receipt of the electric current via a second electrical circuit; and
    a common electrical path configured to direct the electric current to a node housed within a wire harness, wherein the first electrical circuit is configured to direct the electric current from the node to the contactor, and the second electrical circuit is configured to direct the electric current from the node to the fan controller.

11. The HVAC system of claim 10, comprising a switch disposed along the first electrical circuit between the wire harness and the contactor.

12. The HVAC system of claim 11, wherein the switch is configured to open the first electrical circuit in response to an operating parameter of the working fluid exceeding a first threshold value, in response to the operating parameter being below a second threshold value, or both.

13. The HVAC system of claim 12, wherein the switch is a pressure switch, and the operating parameter is a pressure of the working fluid discharged by the compressor.

14. A heating, ventilation, and air conditioning (HVAC) system, comprising:
    a first electrical path, a second electrical path, and a third electrical path electrically coupled to one another at a node; and
    a pressure switch disposed along the second electrical path,
    wherein the first electrical path is configured to direct an electric current from indoor HVAC equipment to the node,
    wherein the second electrical path is configured to direct the electric current from the node to a contactor configured to enable a supply of power to a compressor of the HVAC system,
    wherein the supply of power comprises a voltage greater than a voltage associated with the electric current,
    wherein the third electrical path is configured to direct the electric current from the node to a fan controller configured to enable an additional supply of power to a fan of the HVAC system,
    wherein the contactor is configured to direct the additional supply of power to the fan controller in an open configuration of the contactor, and
    wherein the node is housed in a wire harness.

15. The HVAC system of claim 14, wherein the pressure switch is configured to open and block flow of the electric current along the second electrical path from the node to the contactor in response to feedback from a pressure sensor.

16. The HVAC system of claim 15, comprising the compressor, the fan controller, the pressure sensor, and an outdoor unit, wherein the first electrical path, the second electrical path, the third electrical path, the node, the compressor, the fan controller, and the pressure switch are disposed within the outdoor unit, and wherein the HVAC system comprises:
    a heat exchanger disposed within the outdoor unit; and a fan disposed within the outdoor unit and configured to direct an air flow across the heat exchanger, wherein the compressor is configured to direct a refrigerant to the heat exchanger, wherein the pressure sensor is configured to detect a pressure of the refrigerant discharged by the compressor, and wherein the fan controller is configured to control operation of the fan.

* * * * *